Patented May 30, 1950

2,509,642

UNITED STATES PATENT OFFICE 2,509,642

WOOD FILLING MATERIAL AND METHOD OF ITS MANUFACTURE

Drahomír Horsák, Brunn-Kralovo Pole, Czechoslovakia

No Drawing. Application July 22, 1946, Serial No. 685,373. In Czechoslovakia April 12, 1940

6 Claims. (Cl. 106—196)

This invention relates to a wood filling material and to a method of manufacturing it.

The synthetic moulding materials, especially synthetic resins, usually have a filler of wood-pulp, fibrous wood-cellulose or the like, as is well known in the art. Filled masses obtained in this way have, however, a low strength and are too fragile, because the filling materials, in consequence of their fine-grained character, do not provide the necessary toughness. On the contrary they even tend to reduce the low cohesion of the basic material.

The invention relates to a wood filling material for synthetic resins of all kinds, the material consisting of bodies, articulated only to a relatively small degree and produced with the retention of the natural structure and unimpaired cellular bond of the wood so that by the strength and cohesion of its particles, which is further increased by impregnation and a felting process, it gives to the basic material considerable strength, elasticity and toughness. Products made of synthetic materials filled in this way possess an increased resistance not only to wear but also to impact.

The invention relates further to the use of wood filling material provided with a binder, hardenable or not, of the natural or synthetic resins type or other thermoplastic e. g. phenol formaldehyde or urea formaldehyde, synthetic resin, pitch, sulphur, asphalt, rosin, cellulose acetates or the like and treated according to known methods as plastics or powders for producing moulded or pressed articles of all kinds.

The new filling material consists essentially of wood bodies in the form of longitudinal leaves, strips or the like having substantial length and breadth but being very thin. The latter are obtained continuously and uniformly from preferably fresh or refreshed (e. g. steamed) wood by peeling, grating, or grinding, under the fullest possible retention of the natural structure and unimpaired cellular bond of the wood. The dimensions of the bodies are preferably between 0.02″ to 0.002″ thickness and many times this in length, their surface area being between 0.0016 to 16 sq. in. These particles are not brought into a more fibrous state. On the contrary, they must retain their characteristic formation and their rigid cellular bond in spite of being in a felted condition, when they are brought into contact with the basic material or the binding agent as well as during further treatment of the filled synthetic mass, when imparting shape e. g. by casting, spraying, pressing, moulding or the like.

The filling material, being pliable, does not offer any resistance and can be easily shaped into the most complex forms.

Experiments have shown that the wood filling material in the shape such as leaves, sheets, strips or the like may be easily obtained in considerable length and width and minimum thickness, if for the manufacture wood is used, which is as raw as possible and still contains its original humidity, or wood preliminary steamed by wet steam having a temperature between 100° and 150° centigrade.

If, according to this method, raw wood with its original contents of humidity has to be used, it is necessary to take care in an appropriate way to prevent the raw wood from losing its humidity during storage, for instance by storing it in wet or by permanently spraying it with water.

On the other hand, it has been found particularly advantageous to deprive the wood of its humidity prior to the manufacture (for instance in special drying plants), if wood filling material has to be obtained having the shape of fibrous bodies such as fibres, needles, rods, longitudinal chips or the like.

The wood filling material according to this invention is produced by peeling, grating or grinding a rotating block of wood by means of a suitable tool, working as far as possible parallel to the axis of the block as well as to the direction of the natural fibres of the wood. The wood block should rotate at a speed of more than 300, and preferably more than 1000, revolutions per minute. A peeling tool works substantially in a tangential direction, grating tools approximately in a radial direction and grinding tools again in a tangential direction. For the manufacture of longitudinal chips dry wood is well suited, whereas for obtaining two-dimensional bodies fresh or steamed wood is more preferable. A few practical examples will be given below.

A knife is automatically moved towards a rotating wooden block having a diameter of e. g. 8″ and a length of 5 ft. The cutting edge of the knife, also 5 ft. long, is substantially parallel to the axis of the block. The feeding movement of the knife is perpendicular to the axis of the block, but the cutting edge is ground and positioned in such a way, that it engages the block in tangential direction. As soon as the knife engages the block it cuts along the circumference of the block a wooden leaf 5 ft. wide and say 0.008″ thick, which can be of considerable length limited only by the diameter of the wooden block.

If the knife engages the block in such a way that its cutting edge is directed roughly towards the centre of the block, longitudinal fibres of a length of 5 ft. and diameter of say 0.008" are formed at a suitable rotation of the block and speed of the feeding movement of the knife. As filling materials do not usually require such a length, dividing projections are provided on the knives, said projections being about 0.12" high and 0.04" wide and spaced from each other by about 8". If the knife engages the block tangentially long strips 8" wide and 0.008" thick are obtained. If the cutting edge of the knife is directed towards the centre of the block, chips 8" long and 0.008" thick are produced.

The wooden filling material according to the invention can be used in suitable relative quantities in connection with the widest varieties of synthetic masses, in particular with synthetic resins. For example, by mixing 60 parts of filling material in leaf form with 40 parts of aminoplast such as the urea formaldehyde aforementioned, a mass excellently suited for pressing or moulding is obtained, the mass being suitable in particular for the manufacture of articles subject to considerable loads such for example as handwheels for machine-tools. When coal pitch or asphalt is used as a binding agent a thermoplast mass is obtained which is suitable for spraying and can be used for the manufacture of insulating plates or other articles produced by spraying.

I claim:

1. In a manufacture of the character described, wood in paper-thin pieces of about 16 square inches cut parallel to the grain and retaining the amount of water content natural to the wood, together with a binder uniting the pieces mostly in parallel planes but also heterogeneously.

2. A manufacture as claimed in claim 1 wherein the wood fragments are of 0.002 to 0.02 in. thickness.

3. A manufacture as claimed in claim 1 wherein the very thin pliable wood fragments are of substantially uniform size.

4. A manufacture as claimed in claim 1 wherein the very thin fragments are of fresh wood and substantially 8 inches in their length.

5. A manufacture as claimed in claim 1 wherein the thin pliable wood fragments are about 0.008 in. thick and about 8 in. long.

6. A manufacture as claimed in claim 1 wherein the binder is about 40 per cent of the total.

DRAHOMÍR HORSÁK.

REFERENCES CITED

The following references are of record in the file of this patent:

UNITED STATES PATENTS

| Number | Name | Date |
|---|---|---|
| Re. 8,258 | Meech | May 28, 1878 |
| 106,710 | Meech | Aug. 23, 1870 |
| 228,899 | Holmes | June 15, 1880 |
| 1,446,888 | Dyckerhoff | Feb. 27, 1923 |
| 1,597,538 | Novotny | Aug. 24, 1926 |
| 1,633,738 | Fish | June 28, 1927 |
| 1,664,601 | Ellis | Apr. 3, 1928 |
| 1,832,807 | Ellis | Nov. 17, 1931 |
| 1,891,430 | Loetscher | Dec. 20, 1932 |
| 1,959,375 | Loetscher | May 22, 1934 |
| 2,066,734 | Loetscher | Jan. 5, 1937 |
| 2,095,652 | Silberman | Oct. 12, 1937 |
| 2,103,776 | Geistlich | Dec. 28, 1937 |
| 2,343,247 | Simons | Mar. 7, 1944 |
| 2,381,269 | Elmendorf et al. | Aug. 7, 1945 |
| 2,392,162 | Lewis | Jan. 1, 1946 |

OTHER REFERENCES

Truax Forest Products Lab. Report 914, Oct. 1930. (4 pages.)

Koall Kustoffe, vol. 34, pages 98–100; May 1944.